June 13, 1967 H. M. FOX 3,325,711
MULTIPLE-PHASE MOTOR-CONTROL ELECTRIC SYSTEMS
Filed Oct. 6, 1964

INVENTOR
HARVEY FOX
BY Rines and Rines
ATTORNEYS

United States Patent Office 3,325,711
Patented June 13, 1967

3,325,711
MULTIPLE-PHASE MOTOR-CONTROL
ELECTRIC SYSTEMS
Harvey M. Fox, Lexington, Mass., assignor to John C.
Simon, Jr., Weston, Robert H. Rines, Belmont, and
Paul R. Johannessen, Lexington, Mass.
Filed Oct. 6, 1964, Ser. No. 401,786
6 Claims. (Cl. 318—207)

ABSTRACT OF THE DISCLOSURE

The invention relates to a multiple-phase power motor such as those employed in servo systems and permits continuous use of full power with control response for low input signals by a novel combination of reference and control-voltage characteristics employing a substantial portion of full reference voltage excitation at zero input voltage.

---

The present invention relates to motor-control electric system, and, more specifically, to multiple-phase high power motors such as those used in power servo systems and the like.

When servo motors and similar apparatus, each hereinafter generically referred to as a "motor," are constructed to operate with power outputs of hundreds of watts or more, difficulties are encountered as a result of the high heat rise produced within the motor frame, prohibiting the use of full power for continuous operation or during periods of extended servo-operation acceleration and the like. In addition, non-linear torque characteristics are produced in the usual control system that provide zero loop gain for low input signals so that effective control for such signals is not attainable.

An object of the present invention, accordingly, is to provide a new and improved electric system that obviates these difficulties and permits the continuous use of full power in high power-output servo motors and the like and with control response for low input signals. In summary, this end is attained by a novel combination of reference and control-voltage characteristics employing a substantial portion of full reference voltage excitation at zero input voltage.

A further object is to provide a novel motor-control system of more general utility, also.

Other and further objects will be explained hereinafter and will be more fully pointed out in the appended claims.

The invention will now be described with reference to the accompanying drawings, FIG. 1 of which is a schematic circuit diagram illustrating the invention in preferred form;

Figure 1:
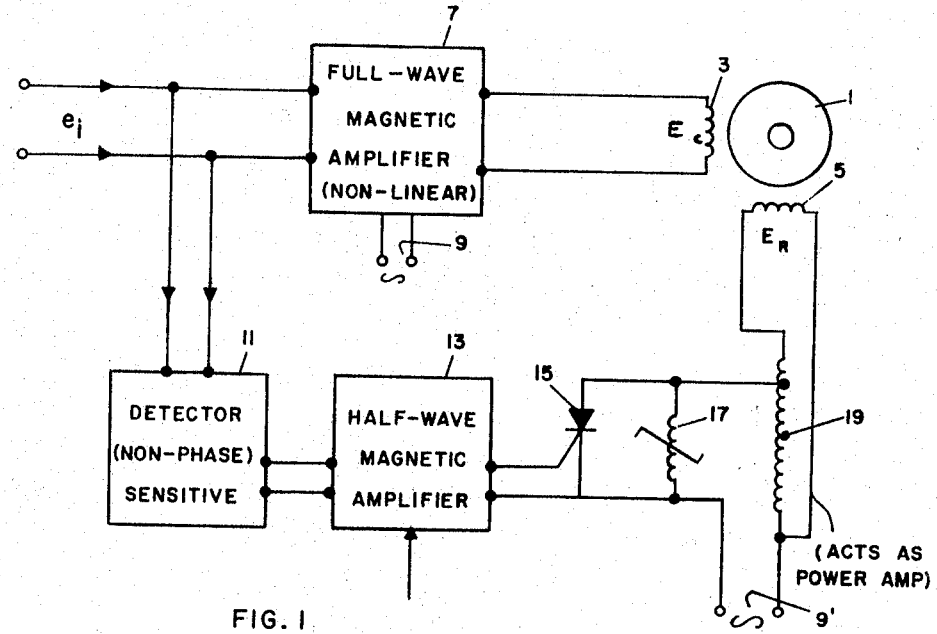
Figure 3A:
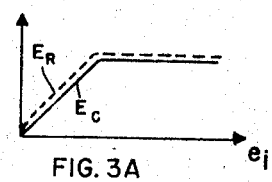
FIGS. 3A through 3D are graphs of voltage and torque characteristics.
Figure 3B:
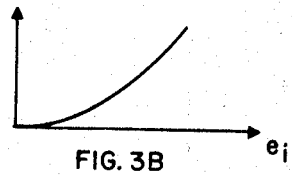

Referring to FIG. 1, the servo motor or similar apparatus is shown at 1 having a control phase voltage winding 3 for receiving a control voltage $E_c$ and a reference phase voltage winding 5 for receiving a reference voltage $E_R$. In prior-art systems of this character, the control voltage $E_c$ and reference voltage $E_R$ are developed as shown in the respective solid and dotted-line graphs of FIGS. 3A, increasing together from zero value at zero input voltage ($e_i$) to full reference and control voltages. The resulting torque characteristic is a quadratic rise as shown in FIG. 3B that, while satisfactory for some low power-output motor applications, is undesirable from a control point of view because it gives rise to zero or substantially zero loop gain at low signals. Additionally, the heating problems before discussed are encountered at high power outputs, limiting the full-power use of the devices for sustained or continuous operation.

Figure 3C:
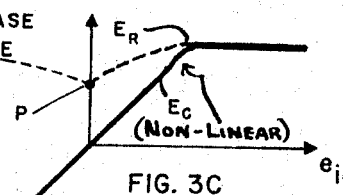

In accordance with the present invention, on the other hand, the reference voltage $E_R$ is not zero at zero input voltage $e_i$, but, as shown in FIG. 3C, is started from a point P (at $e_i=0$) that is a substantial fraction of the full $E_R$, illustrated as about one-half the same, $E_R/2$. Thus, under zero input voltage, the reference phase winding 5 is excited by only half its full excitation and thus only one-quarter the power. As signal is applied and $e_i$ increases, the reference voltage increases only another half of full voltage substantially linearly to full value. Further, in accordance with the invention, it has been found necessary that the control voltage $E_c$ be caused non-linearly to increase (solid-line curve of FIG. 3C), in order to produce thereby a resultant or overall linear torque characteristic of FIG. 3D, obviating the low signal loop-gain response and overheating problems before discussed.

Figure 3D:
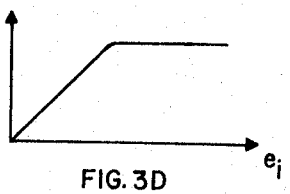

Preferred apparatus for achieving the operation of FIGS. 3C and 3D is illustrated in FIG. 1, the non-linear rise characteristic $E_c$ being obtainable by, for example, a full-wave magnetic amplifier 7 (as of the type described by Paul R. Johannessen in "Application of Switching Transistors and Saturable Reactors in a High-Performance Servo," Proceedings of the AIEE, January 1960, pages 466–473; particularly, FIG. 16), fed with, for example, a 400-cycle power input voltage at 9. The reference phase voltage, starting at substantially $E_R/2$ for zero signal voltage $e_i$, is shown attained by means of a circuit comprising a detector 11, a one-half-wave magnetic amplifier 13, a switching silicon-controlled rectifier 15 in the output of the amplifier 13 shunted by a saturable reactor 17 to serve as a switching power amplifier, that, in turn, feeds an autotransformer 19 for applying the amplified reference voltage to the reference phase winding 5. The detector 11 is of the non-phase sensitive type (such as a typical diode detector) and the amplifier 12 may be of the type described by the said Johannessen in "Analysis of Magnetic Amplifiers with Diodes," Proceedings of the AIEE, Nov. 1, 1959, pages 485–504; (particularly FIG. 1A), having a firing angle adjustment $\phi_Q=90°$. In operation, the switching rectifier 15 will be rendered conductive at or near the peak or top portion of the positive half-cycle of the A.C. power input voltage at 9', under the control of the detected signal output of the amplifier 13. Further switching rectifiers could be used for the negative half-cycle; but for purposes of economy and simplicity, the saturable reactor 17 is employed, shunted across the rectifier 15 and saturating to effect switching action at the corresponding portion of the negative half-cycle. Thus a switching power amplification of the reference signal is produced, providing a substantially linearly increasing reference voltage starting from the initial value at $P=E_R/2$, for example. Because the detector 11 is of the phase-insensitive type, the same linear rise is produced in the left-hand quadrant, while the control voltage $E_c$ has a reversed phase (negative) quadrant, FIG. 3C. As further shown in FIG. 3C, the circuits are adjusted to reach full $E_R$ and $E_c$ at the same value of $e_i$.

Figure 2:
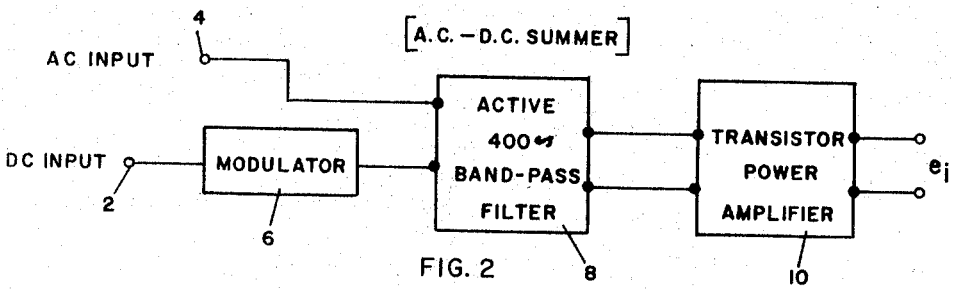
FIG. 2 is a block diagram of an input portion of the system of FIG. 1.

The invention has been found to be particularly useful with 400-cycle servo motors as, for example, of the Diehl power servo type P162 (Singer Manufacturing Company, New Jersey), providing for the use of full power in continuous operation even up to 750 watts output without overheating and with linear torque characteristics and low-signal control response. The source of signal control input voltage $e_i$ was developed from D.C. and A.C. input signals applied at 2 and 4, FIG. 2, respectively, through a modulator 6 and directly to an A.C.-D.C. summing circuit, shown comprising an active 400-cycle band-pass filter 8; though other summing circuits with quadrature rejection may be used, such as those described in U.S. Letters Patent No. 2,961,590, for the well-known reasons therein explained. The output of the summing circuit, after amplification at 10 was employed as the servo control input signal $e_t$.

Further modifications will occur to those skilled in the art and all such are considered to fall within the spirit and scope of the invention as defined in the appended claims.

What is claimed is:

1. An electric system for providing motor control and reference phase voltages, having, in combination, a motor provided with control and reference phase windings, a source of input voltage for driving the motor, a control circuit comprising amplifier means responsive to the said input voltage and connected to the control winding to apply a control voltage thereto that increases with input voltage from substantially zero value at zero input voltage to a full control voltage value, a reference circuit comprising a detector responsive to the input voltage and connected to further amplifier means driving the reference winding and adjusted to apply a reference voltage thereto that increases with input voltage from a substantial fraction of full reference voltage at zero input voltage to such full reference voltage, the control and reference circuits being adjusted to produce the said full control voltage and full reference voltage, respectively, for substantially the same value of input voltage, the said detector being phase insensitive and the further amplifying means comprising a half-wave magnetic amplifier, with the power amplifying switching means being connected between the further amplifier means and the said reference winding and to a source of A.C. power voltage to conduct at a predetermined portion of one half-cycle of the power voltage, the switching means comprising silicon-controlled rectifier means, the said system being further provided with saturable reactor means connected in shunt with the rectifier means to produce saturation at a corresponding portion of the other half-cycle of the said power voltage.

2. An electric system having, in combination, a motor having a reference phase winding, sources of motor-control voltage, and A.C. power voltage, detector means connected with and responsive to the voltage of the control voltage source, first amplifier means connected to the detector means, power-amplifier means comprising switching means connected between the first amplifier means and the said winding and to the said power voltage source, the switching means comprising rectifier switching means operable to conduct at a predetermined portion of one-half cycle of the power input voltage, and saturable reactor means connected in shunt with the rectifier switching means to produce saturation at a corresponding portion of the other half-cycle of the power voltage.

3. An electric system as claimed in claim 2 and in which autotransformer means is connected between the saturable reactor means and the reference winding.

4. An electric system for providing motor control and reference phase voltages, having, in combination, a motor provided with control and reference phase windings, a source of input voltage for driving the motor, a control circuit comprising amplifier means responsive to the said input voltage and connected to the control winding to apply a control voltage thereto that increases with input voltage from subsanially zero value a zero input voltage to a full control voltage value, a reference circuit comprising a detector responsive to the input voltage and connected to further amplifier means driving the reference winding and adjusted to apply a reference voltage thereto that increases with input voltage from a substantial fraction of full reference voltage to such full reference voltage, the control and reference circuits being adjusted to produce the said full control voltage and full reference voltage, respectively for substantially the same value of input voltage and in which the source of input voltage comprises A.C. and D.C. input signal-applying means, modulator means connected to the D.C. input signal-applying means, A.C.-D.C. summing means connected with the A.C. input-signal-applying means and the modulator means, and power amplifier means connected to the summing means.

5. An electric system as claimed in claim 4 and in which the summing means comprises an active band-pass filter.

6. In an electric system for driving a motor with a predetermined frequency power voltage, a source of signal control voltage for the motor having, in combination, D.C. input-signal-applying means, A.C. input-signal-applying means, A.C.-D.C. summing means connected with the said A.C. input-signal-applying means and the said modulator means, the summing means comprising an active band-pass filter at the said frequency, and power amplifier means connected to the filter to produce the said motor signal control voltage.

References Cited

UNITED STATES PATENTS

| | | | |
|---|---|---|---|
| 2,774,022 | 12/1956 | Malick | 318—207 |
| 2,821,674 | 1/1958 | Hughes | 318—207 X |
| 2,910,637 | 10/1959 | Garnier | 318—207 |
| 2,956,222 | 10/1960 | Hill et al. | 318—207 X |
| 3,054,945 | 9/1962 | Kafka | 318—513 X |

ORIS L. RADER, *Primary Examiner.*

G. Z. RUBINSON, *Assistant Examiner.*